Clarence W. Brandon
INVENTOR.

Sept. 21, 1954   C. W. BRANDON   2,689,462
METHOD AND APPARATUS FOR THE STORAGE, REFRIGERATION, AND
TRANSPORTATION OF VOLATILE LIQUIDS
Original Filed July 16, 1948   5 Sheets-Sheet 4

Clarence W. Brandon
INVENTOR.

Patented Sept. 21, 1954

2,689,462

UNITED STATES PATENT OFFICE 2,689,462

METHOD AND APPARATUS FOR THE STORAGE, REFRIGERATION, AND TRANSPORTATION OF VOLATILE LIQUIDS

Clarence W. Brandon, Tallahassee, Fla., assignor, by direct and mesne assignments, of forty-two and one-half per cent to N. A. Hardin, Hazel H. Wright, and Catherine H. Newton, Forsyth, Ga., and fifteen per cent to Harvey B. Jacobson, Washington, D. C.

Original application July 16, 1948, Serial No. 39,154. Divided and this application July 27, 1951, Serial No. 238,964

21 Claims. (Cl. 62—1)

This invention relates to novel and useful improvements in a method and apparatus for the storage, refrigeration and transportation of volatile liquids and other fluids, and more particularly has reference to a method and apparatus for improving the transportation and storage of such fluids in barges, with particular attention to reducing excessive temperatures and pressures generated in fluids which are confined in containers and are exposed to external sources of heat. Although not limited to this field, my invention finds a special utility in its application to a method and apparatus for efficaciously confining highly volatile liquids, such as liquefied petroleum gases, ammonia, or the like, in tanks and in such a manner that these tanks may constitute the essential portions of the hulls of barges and the like.

The present application is a division of my copending application, Serial No. 39,154, filed July 16, 1948, for Method and Apparatus for the Storage, Refrigeration and Transportation of Volatile Liquids and Other Fluids.

In its simpler aspects and broadest principles, the present invention represents an improvement upon and relates to somewhat similar subject matter to that disclosed in the prior patent of Clarence W. Brandon and George M. Brandon, Patent No. 2,408,505, patented October 1, 1946.

In the field of transportation and storage of volatile liquids, and especially in the use of tanks or barges which are designed to transport liquid upon waterways, it has been heretofore recognized as essential that the compartment receiving the volatile liquid shall be completely filled in order to avoid the detrimental effects of splashing or shifting centers of gravity of a container which is partially filled and subjected to a rolling or tossing action during transit. Industry has long known that when such tanks are employed as barges or other portable containers and are completely filled with highly volatile or other liquids and subjected to external sources of heat, such as to the variable temperatures produced by the rays and heat of the sun, or the like, the increase in temperature of the liquids which completely fill and are confined in a storage compartment produces very great increases in the pressures to which such liquids are subjected.

By way of illustration, it may be noted that in one type of barge or tank, which is approximately 90 feet in length and about 9 feet in diameter, the pressures of the contained liquid where no vapor space is provided, and consequently to which the walls of the container are exposed, may rise from slightly above atmospheric pressure to values of about 450 pounds per square inch, at which pressures rupture of the container is threatened unless pressure relief is provided, these pressures arising directly and solely from the thermodynamic expansive forces created in the liquid contents of the tanks by the heat of the sun's rays or the like. Obviously, it has been necessary, therefore, to employ tanks of very thick metallic plate construction, the example above mentioned usually requiring metal plates of 1⅛ inch in thickness.

It will be apparent that if some means were provided for reducing the pressures generated by the expansion of the liquid contents occasioned by the above-mentioned source, and maintaining the maximum pressures thus generated to predetermined lower and safer limits that would normally occur with no provision for the relief of pressure, the tanks could be of much lighter material with a resultant appreciable economy in the constructing, handling and transporting of the same.

As a primary purpose, the invention aims to provide a tank for receiving volatile liquids which may be of appreciably lighter and more economical construction, yet will be more serviceable in use than conventional containers heretofore used.

Accordingly, it is a fundamental intention of this invention to provide a process and a means for reducing the pressures to which the confined liquids in such tanks are subjected; to utilize the thermodynamic forces developed within the body of liquids in such tanks for carrying out the method and actuating the apparatus designed to alleviate the above-mentioned detrimental conditions; and, in particular, to provide a refrigerating system in which the liquid itself constitutes the refrigerant, whereby the thermodynamic forces developed within the confined liquid will cause a circulation of the refrigerated portions of the liquid to thereby lower the temperatures existing in the liquid and hence reduce the thermodynamic pressures developed therein; and by further providing an extremely sensitive auxiliary refrigerating system incorporated in the above elements and which shall be periodically and intermittently operated by thermodynamic forces in confined bodies of liquids to effect the above-mentioned functions and purposes.

This invention, therefore, has for its primary objects the development of improved methods and apparatus for reducing the peak or maximum pressures which are thermodynamically generated within confined bodies of volatile liquids.

A further object of the invention is to provide a method and apparatus wherein a portion of the volatile liquid is utilized to produce a refrigerating effect upon the main body of the liquid to thereby lessen the pressures to which the confined body of liquid is subjected.

Still another object of the invention is to provide a method and apparatus wherein the thermodynamic pressures generated within a confined body of liquid are utilized to temporarily discharge a portion of that liquid for reducing the maximum pressure to which the confined body of liquid is subjected.

Yet another very important object of the invention resides in the provision of a method and apparatus as set forth in the preceding objects wherein the variations in pressure produced in a confined body of volatile liquid by the influence of varying temperatures thereon are utilized to effect a cyclic flow of a portion of the liquid out of and back into the confined body of liquid to thus reduce the extremes of pressure to which the confined liquid is subjected.

An additional object of the invention is to provide an apparatus and method in accordance with the preceding object wherein the cyclic circulation of liquid from the confined body is caused to suffer an expansion or drop in pressure during the course of its flow from and back into the confined body, which expansion is utilized to effect a refrigerating action upon the balance of the confined body of liquid.

Another very important object is to provide a very compact, efficient and improved conduit system for circulating a portion of the stored liquid for an efficient refrigerating action upon predetermined areas of the surface of the container, in heat exchange relation with and for cooling predetermined portions of the contents of the tank.

Still another important object of the invention resides in the provision of an apparatus and method as set forth in the foregoing objects wherein the liquid withdrawn from the storage compartment of the tank is removed from the cooler portions thereof, and wherein the circulating refrigerated portions of the liquid are returned to the upper or warmer portions of the storage tank.

A further and very important object of the invention is to provide a method and apparatus for refrigerating confined bodies of liquids subjected to varying thermodynamic pressures therein by withdrawing, circulating and returning a portion of the confined liquids by means of the thermodynamic pressures to which they are subjected in the confined body, and by so arranging the course of travel of the withdrawn portion as to subject that portion to the immediate influence of the external source of heat to which the confined body of liquid is subjected in order to thereby obtain a more rapid and hence more sensitive fluctuation of pressure in the withdrawn portion of the liquid and in the confined body with a view to causing a more rapid series of intermittent refrigerating operations upon the confined body of liquid.

Another object of the invention is to provide a method and apparatus as set forth in the foregoing objects wherein provision is made for releasing the pressure upon the confined body of liquid and for venting the same, without loss of liquid or its vapor, to facilitate the loading or unloading of the tank.

An important feature of the invention resides in the provision of a storage tank or container which is divided by a partition into a storage compartment for confining bodies of volatile liquids and a vapor compartment, each of these compartments being sealed from the atmosphere, together with conduit means connecting these compartments for selectively effecting a flow of liquid from the liquid compartment to the vapor compartment and for effecting a return of liquid condensate from the vapor compartment into the confined liquid storage compartment.

A further feature of the invention resides in the provision of an apparatus as set forth in the preceding paragraph wherein pressure relief valve means are provided for controlling the flow of liquid through the conduit means from the storage compartment to the vapor compartment, for thereby effecting a reduction of pressure upon the withdrawn liquid for producing a vaporizing and refrigerating effect thereon.

An additional feature of the invention resides in the provision of a tank which is ideally adapted for use as a barge and wherein there are provided blisters upon the sides of the same for improving the stability of the barge, for increasing the constructional strength of the tank, and for assisting in cooling the contents of the same.

Yet another feature of the invention resides in the provision of a barge for the transportation of volatile liquids upon waterways, wherein the blister construction is arranged to overlie a portion of the vapor compartment formed within the barge to effect a greater cooling effect thereon and to thereby improve the refrigerating of the contents of the barge.

Another important feature of the invention resides in the provision of a barge having a lower confined liquid storage compartment and an upper confined vapor compartment, together with conduit means and mechanism for effecting periodic, cyclic circulations of liquid from the cooler portion of the confined body of liquid into the vapor chamber, reducing the pressure upon the liquid so inducted into the vapor chamber to produce a refrigerating effect therein, collecting the condensate of the liquid inducted into the vapor chamber in cooler portions thereof, and subsequently returning the collected condensate into the confined chamber at the hotter portions thereof.

Still another important feature of the invention resides in the provision of a container for volatile liquids having separated liquid storage and vapor compartments, and wherein the vapor compartment is provided with sloping channels or gutters for collecting the liquid condensate therein into a sump together with conduit means for automatically and periodically withdrawing the condensate from the sump in response to pressure variations effected by the thermodynamic action of external sources of heat upon confined portions of the volatile liquid.

These, together with various ancillary objects and features of the invention, which will later become apparent as the following description proceeds, are attached by this invention, preferred embodiments of the methods and apparatuses of which have been illustrated, by way of example only of the principles thereof, in the accompanying drawings, wherein:

Reference is now made more specifically to the accompanying drawings, for an understanding of the principles of construction and features of operation of this invention, like numerals indicating similar parts throughout the various views, and the same numerals being employed as are used to designate corresponding parts in my copending application, Serial No. 39,154.

Figure 1:
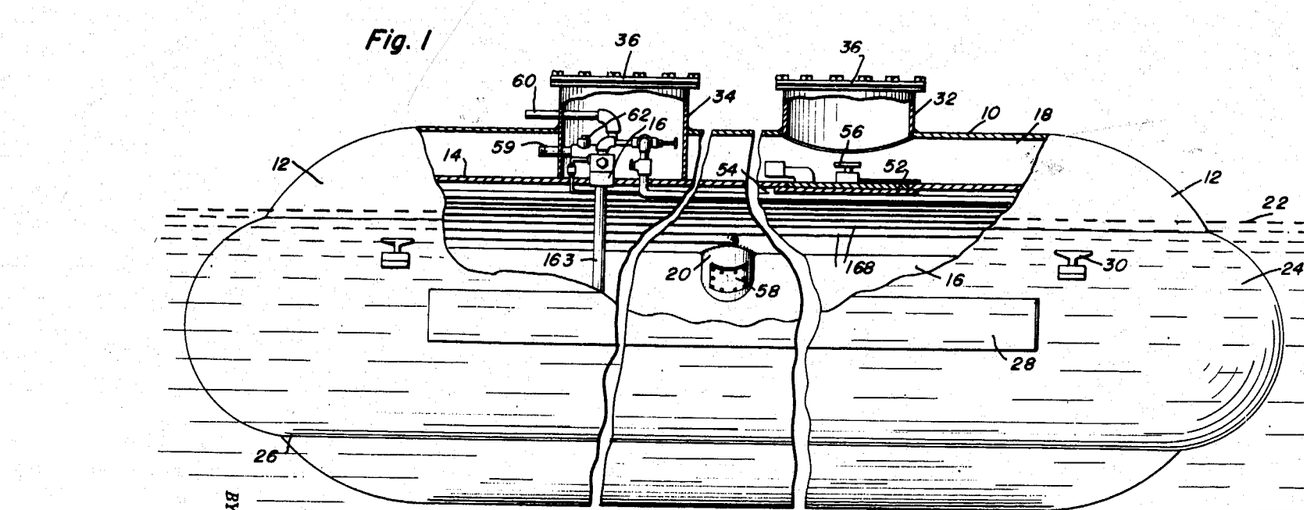
Figure 1 is a side elevational view, parts being broken away, of the preferred embodiment of this invention, parts being shown in section, and illustrating the manner in which a storage tank is utilized as the main hull structure of a barge.

Disclosed in Figure 1 is a practical embodiment of a tank which has been modified to adapt the same to function as the hull or shell of a barge, in accordance with the basic concept of this invention. Although it is to be understood that the tank may be of various shapes and proportions and is not to be limited to that illustrated, a satisfactory embodiment may consist of a cylindrical elongated casing or container 10 having spherically rounded end portions 12, this tank being of metallic plate or the like, although any suitable material may be employed having the requisite strength.

Within the tank 10, and preferably, although not necessarily, extending throughout the entire length thereof, is a partition 14 which divides the tank into a lower compartment 16 constituting a storage chamber for receiving and containing volatile liquids therein, and an upper compartment 18 comprising a vapor chamber. As will readily be understood, the chambers 16 and 18 are completely sealed from each other by means of the partition 14, and preferably comprise pressure-tight chambers.

In this embodiment of the invention it will be seen that the partition 14 is shaped as an arcuate plate having its concave surface forming a part of the wall of a volatile liquid storage chamber 16, while its convex surface forms a part of the wall of the vapor chamber 18. The vapor chamber 18 is thus crescent shaped in cross section.

It will thus be seen that the convex surface of the partition 14 constitutes the bottom wall or floor of the vapor chamber 18, and slopes from the center toward both sides thereof, and the junction of the partition 14 with the tank 10 thus provides a continuous trough or channel about the marginal edge of the partition 14.

In some instances, this trough or channel will be found sufficient for the purposes desired; but it is preferred to accentuate such trough or channel by providing a depressed portion or portions 20 which constitute sumps for collecting and receiving vapor condensate therein as set forth hereinafter. If desired, these sumps 20 could extend around the entire periphery of the partition 14, or alternately could be provided at predetermined spaced positions thereon. Moreover, the lower surfaces of those portions of the troughs or channels which define the sumps 20 will preferably slope upwardly from the sides of the sumps to the junction of the partition 14 with the tank 10, whereby ready collection and drainage of any vapor condensate within the compartment 18 will be effected and such condensate will be conducted to the lowermost portions of the sumps 20.

A conduit system to be specifically set forth hereinafter is provided for establishing controlled communication between the storage chamber 16 and the vapor chamber 18. It is contemplated that the storage chamber 16 shall be filled with the volatile liquid to be transported at all times, and said body of liquid completely filling the chamber 16 will be confined therein. The curved walls of the chamber 16 thus are ideally adapted to offer the maximum strength for retaining the confined liquid and the pressures generated therein by the thermodynamic action upon the confined liquid of varying increases in temperature effected by the sun's rays upon the tank or by other external sources of heat. It is intended that when the tank is constructed as a barge, as illustrated in this embodiment of the invention, the continuously completely filled storage compartment 16 and the vapor chamber 18 thereabove will be immersed into water to an extent indicated by the water line or level 22.

In order to promote the stability of the barge when the same is immersed in the water, a blister construction is secured thereto as by welding or in any other manner. This blister construction consists of an arcuately shaped casing 24 which is secured to the tank 10 as by welding 26, or the like, and thus defines convex extensions protruding laterally from the walls of the tank 10.

I may prefer, in some instances, to extend this blister 24 as a continuous casing around the entire circumference of the tank 10, but in some instances I may prefer to form the blister as a series of spaced housings on one or both sides of the tank 10, at either or both ends thereof, in accordance with the dictates of the use which is contemplated.

It is contemplated that the blisters or sponsons 24 will provide greater buoyancy for the barge, will improve the stability of the same against rocking or rolling as in heavy seas, will reinforce and strengthen the side walls of the barge, and will serve other purposes as set forth hereinafter.

The uppermost junction of the blister 24 with the wall 10 will preferably be below the normal water line 22 of the loaded tank, but will overlie the line of junction of the partition 14 with the wall 10, whereby the top of the blister will constitute a shield or screen which will tend to shade the sumps 26, and the vapor condensate collection troughs or channels from the direct heating effect of the sun's rays or the like, and will further insulate the storage compartment from the heating effects of the relatively warmer, upper layer of water in which the tank is immersed, to thus assist in producing a cooling effect upon these troughs, channels and the sumps 26. It should be here noted, and this principle is advantageously employed by this invention, that the temperature of open bodies of water even a slight distance below the surface remains at a relatively cooler and less rapidly variable temperature than the surface layer. Consequently, in a barge immersed therein, the lower portion of the barge and its contents will be substantially cooled relative to its upper portion.

Preferably secured, as by welding or the like, to the outer surfaces of the blisters 24 are rub rails 28, of any desired construction but preferably having vertical surfaces which act as buffers to shield and protect the blisters and hence the sides of the tank 10 from damages by collision, or the like, and which further may serve as abutment surfaces for securing a plurality of tanks together, in order to form a raft of tanks for more convenient pulling. Further secured to the blisters 24 in any desired locations thereon, as by welding or the like, are cleats 30 by means of which suitable cables may be attached to the barge for anchoring or moving the same. It should be here noted that the location of the cleats upon the blisters is a desirable feature in that the strains transmitted to the tank 10 by the cleats are thus distributed by means of the blisters 24 over a wider surface of the tank whereby the tank may be of much lighter construction than if the cleats were directly attached thereto.

Surmounting the top surface of the tank 10 is a plurality of domes, any desired number being provided, two being indicated by the numerals 32 and 34, these domes conveniently but not necessarily consisting of tubular members secured to and passing through the upper surface of the tank 10 and extending thereabove to be provided with detachable closures or covers 36 of any desired construction. Preferably, one of these domes, such as that indicated at 32, provides a means for obtaining access to the vapor compartment 18, and to the mechanism housed therein; while another of the domes, such as that indicated at 34, extends through the vapor compartment 18 and is attached to the partition 14 to provide a well or other chamber containing various control means for the mechanism with which the barge is provided.

Attention is now again directed to Figure 1 wherein it will be seen that the partition 14 is provided with suitable covers 52 which are hinged as at 54 for controlling manholes in the partition by means of which access may be obtained to the interior of the storage compartment 16, these hinged manhole covers being provided with locking means such as a locking wheel 56 of any known and suitable construction. Obviously, any desired number of these manhole covers may be provided throughout the length of the partition 14. It is to be understood that this construction may be employed in any of the various embodiments of the invention disclosed and set forth hereinafter, as desired.

Further, as shown in Figure 1, the sumps 20 may be provided with detachable covers or closure plates 58 likewise of any suitable design, by means of which access may be had to the sumps 20 for inspection or cleaning the same, from the interior of the compartment 16.

A pressure relief or safety device means is provided for preventing the attainment of a pressure in the vapor chamber 18 above a predetermined desired safe maximum pressure, and for this purpose, as shown in Figure 1, there is provided a conduit 59, extending through the tower 34 into the interior of the vapor compartment 18, which conduit has an outer end 60 extending through the upper wall of the tower 34 into free communication with the atmosphere, a suitable pressure relief valve 62 of any desired construction being included in the conduit and preferably positioned within the well defined by the tower 34 for easy access thereto for inspection, repairs or adjustment of the valve as desired. By this means, provision is made for preventing the pressure within the vapor chamber 18 from exceeding a predetermined value for which the valve 62 is set.

It will be evident that when the volatile liquid storage compartment 16 is completely filled with liquid in accordance with conventional practice during the transportation or storage of liquids in tanks such as those with which the present invention is concerned, that when the temperature to which the confined liquid is subjected is increased, there is a corresponding pressure increase upon the confined liquid, since there is no space for expansion within the storage compartment 16, and since the metallic walls of the same are of negligible expansive qualities. Obviously, if some means were not provided for decreasing the pressures thermodynamically generated within the confined liquid, dangerous pressures would soon be reached which would threaten the rupture of the tank which would be attended by various hazards. In accordance with the basic concept of this invention, means are provided for, first, withdrawing some of the contents of the storage compartment 16 for directly lowering the pressure thereof, second, utilizing the pressure drop of the withdrawn portion of the contents to produce a refrigerating effect which will tend to lower the temperature and thus further reduce the pressure of the confined liquid within the compartment 16, and, third, when the contents of the storage compartment 16 have relatively cooled so that the remaining liquid therein would be subjected to a sub-atmospheric pressure or a relatively reduced pressure below normal upon cooling of the tank, to reintroduce the withdrawn portion of the liquid to restore or equalize the pressure within the compartment 16 to its original value.

Figure 4:
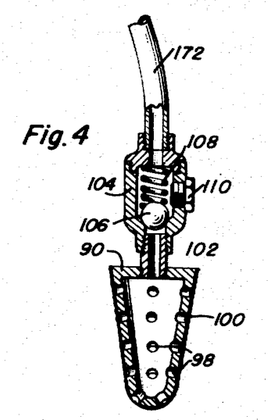
Figure 4 is a fragmentary sectional view taken upon an enlarged scale substantially upon the plane of the section line 4—4 of Figure 3 and illustrating the construction of a strainer and inlet valve forming a part of the return system of the invention.

As shown in the enlarged detail view of Figure 4, the inlet means 90 preferably consists of a housing or casing which may be generally pear-shaped, and is provided with apertures 98 therein, being covered as by a screen 100, this casing being disposed near the bottom of the pockets or sumps 20. This casing is threaded upon one end of a nipple 102 whose upper end is secured to a valve casing 104 which, in turn, depends from the screw-threaded end of the return pipe 92. The valve casing is preferably provided with a suitable check valve 106 which is illustrated as being of the well-known ball construction and closed by means of a spring 108 against a seat formed in the lower end of the casing 104, to thereby permit flow into the pipe 172 from the casing 90, but to prevent return flow. As will be readily understood, various forms of check valves may be employed for this purpose, such as flap valves, or the like. However, the influence of gravity may be relied upon to close the valve, but it is preferred to substitute or assist in this closing action by means of a spring such as that shown.

The valve casing 104 may be provided with a removable plug 110 to obtain access to the same for inspecting, repairing or servicing the check valve as necessity requires.

Figure 1A:
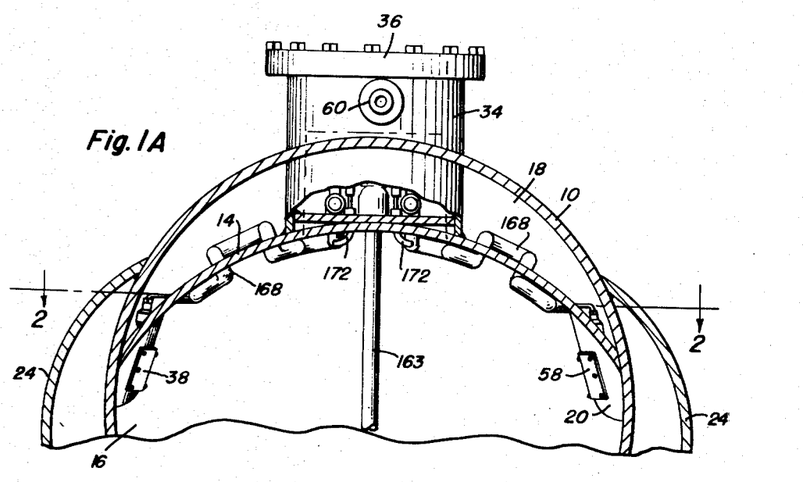
Figure 1A is a fragmentary view taken in vertical transverse section substantially upon the plane indicated by the section line 1—1 of Figure 2, through one embodiment of barge incorporating therein the principles of this invention and showing the arrangement of the refrigerating coils in connection with the storage and vapor chambers of this invention.

The present arrangement presents a refrigerating system which is very sensitive to temperature changes and to relatively small temperature differences between the vapor and storage chambers. In this arrangement, the tank 10, divided by the partition 14 into the volatile storage chamber 16 and the vapor chamber 18, is provided with concentric fluid discharge and return conduits. In the embodiment chosen to illustrate the principles of this type of construction, the discharge or refrigerating conduit system has been shown as the exterior conduit, while the return conduit system has been shown as the interior conduit of the concentric arrangement. However, it will be understood that the principles permit of the reversing of this arrangement, wherever the same is found to be expedient or preferable. As will be seen by reference to Figures 3 and 5, the central top portion of the upwardly curving partition 14 is provided at its highest location with one or more pipes 161 freely communicating with the interior of the storage compartment 16 to provide an outer, return line therefor, while disposed centrally of the return pipe 161 is an outlet pipe 163 whose lower end may conveniently extend into the cooler portions of the compartment 16 and, if desired, into close juxtaposition to the bottom wall thereof as shown in Figure 3. At this upper end, the discharge conduit 163 communicates with a fitting 162 from which extend nipples 164 forming part of a piping connection with expansion valve assemblies 166 which, in turn, are connected with the upwardly extending terminal portions of the refrigerating coils 168 which extend through the partition 14 into the tower 34 where the above-mentioned pressure reduction valves and fittings are located. This refrigerating and expansion coil 168 is then disposed with return bends upon the under surface of the partition 14 in intimate heat exchange relation therewith as will be clearly apparent from Figures 1–3, and may be above or on both sides of the partition as in Figure 1A.

Figure 5:
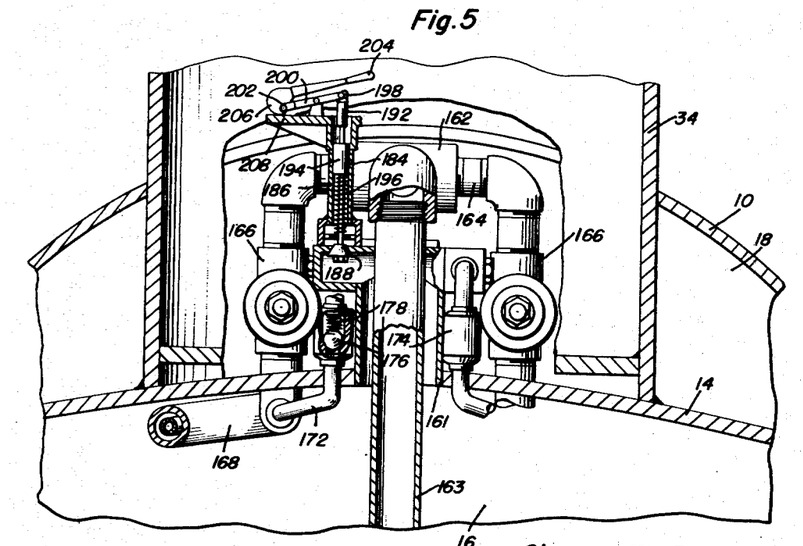
Figure 5 is an enlarged detail view taken in vertical section and showing, in section, certain of the internal details of the arrangement shown in Figure 1 and, in particular, illustrating a combined condensate return valve and pressure release valve employed with this invention.

As shown best in Figure 5, the outermost and return conduit 161 has lateral extensions 170 to which are connected the terminals of the return conduits 172, the conduits 172 being received within the discharge refrigerating conduits 168. Suitable non-return spring-closed check valves are provided in couplings or casings 174, and any desired type of pressure-operated non-return valve may be employed therein, such, for example, as the ball valve 176 which is urged to its seat, as by a spring 178. The other end of the refrigerating conduit 168 extends through the partition 14 as shown in Figure 3 and discharges to the outer surface thereof into the vapor compartment 18, while the corresponding end of the inner conduit 172, constituting a return conduit, is connected as shown in Figure 3 with the check valve housings 104 and liquid inlet members 90 disposed in the sumps 20, which construction may be substantially identical with that previously described with regard to these elements. It should thus be particularly noted that there are two check valves, the assembly 104 and the assembly 174, for the two terminals of the return lines, for a purpose to be later set forth. The discharge and expansion conduit system 168 may be provided with suitable spray nozzles or the like for diffusing the fluid emitted thereby into various portions of the vapor chamber 18.

Preferably, the pressure release valves 166 are spring loaded to maintain a desired pressure within the storage compartment 16 so that when this pressure is exceeded by the above-mentioned thermodynamic action of temperature upon the volatile liquids within the storage compartment, the rising pressure will force a portion of the liquids through the outlet conduit system, through the spray nozzles, and discharge the same into the vapor compartment 18.

It is very important to here observe that as this flow of a portion of the volatile liquid is effected from the storage compartment 16 under the influence of the rising pressures therein which exceed the pressure for which the release valves 166 have been set, the discharging liquid in passing the spring-loaded pressure relief valves will be subjected to a pressure drop or will be expanded in its travel through the following conduit system. As is well known, fluids, when subjected to a diminution of pressure and expanded, are refrigerated or chilled thereby, and the present invention makes use of this pressure drop of the discharge or withdrawn fluids to effect a refrigerating or cooling action upon the tank.

As will be further understood, the magnitude of the cooling action can be somewhat proportioned or regulated by properly adjusting the differences in pressure maintained in the storage compartment 16 by the loading of the pressure release valve 162 or 166 and the pressure maintained as a maximum in the vapor compartment 18 by means of the safety release valve 62.

As will be evident, the ejection of a portion of the contents of the tank 16 will thus serve to reduce the pressure rises created in the storage compartment as the liquid contents thereof are expanded by heat, and the pressure rise therein is further alleviated by the refrigerating or cooling action which converts the pressure drop of the expelled liquids in the vapor chamber into a heat absorbing medium for thereby cooling the partition 14 and hence the upper portion of the contents of the storage tank 16 which immediately underlies the partition. As will be seen, it is the upper portion of the tank which is subjected to the greatest effects of the temperature rise of the confined liquids, and hence the refrigerating action is thereby most efficiently applied.

Figure 2:
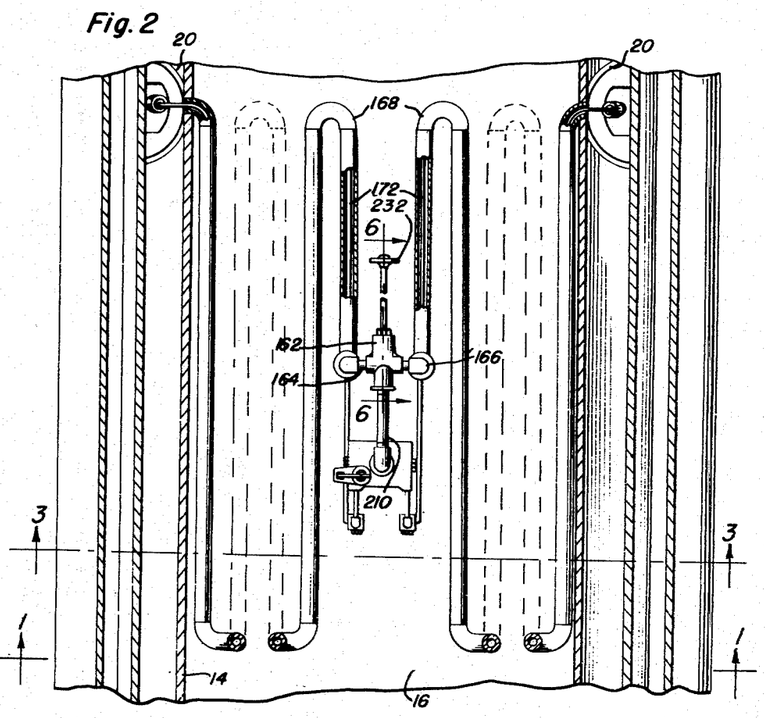
Figure 2 is a substantially horizontal sectional view taken substantially upon the plane indicated by the broken section line 2—2 of Figure 1A and illustrating in plan the arrangement of the recirculating, refrigerating and return conduit system forming a part of the embodiment of Figure 1.
Figure 3:
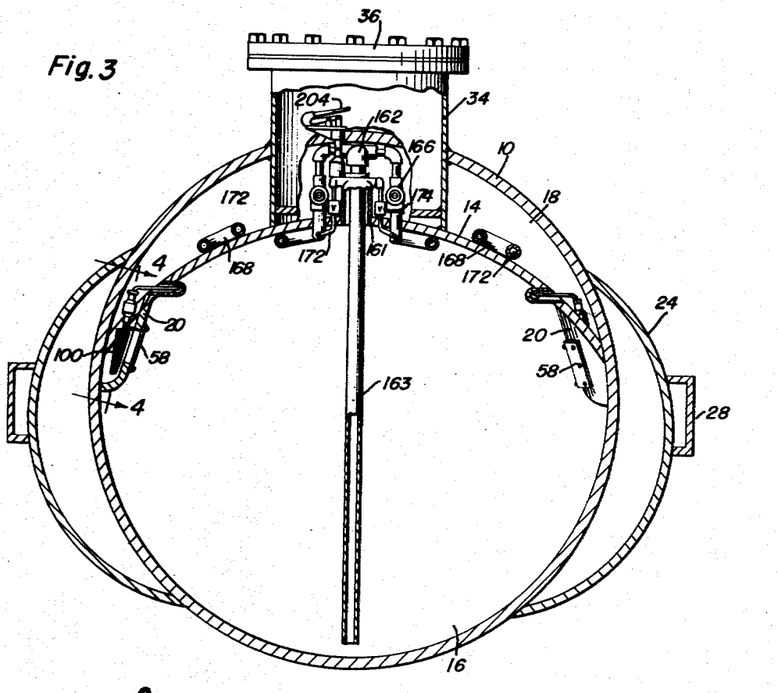
Figure 3 is a view similar to Figure 1, taken substantially upon the plane indicated by the section line 3—3 of Figure 2, and illustrating the arrangement of the condensate collecting sump forming a part of the vapor chamber, and of the screened inlets of the return conduit system therein.

As shown more clearly in Figure 2, the upper end of the return conduit 161 is provided with a head or housing portion 180 having the above mentioned lateral extensions 170, this portion 180 being provided with a manually operable pressure release or venting valve, indicated generally by the numeral 182, which is operable to vent the interior of the storage compartment 16 to the vapor chamber 18 when it is desired to fill or empty the storage compartment, and thus avoid filling or emptying the same against a varying pressure therein. This valve construction includes a tubular conduit 184 having its lower end communicating with the interior of the head portion 180, and having a discharge opening 186 which is in communication with the interior of the vapor compartment 18. The inlet end of the conduit 184 is controlled by a downwardly opening valve 188 which may be of the poppet type, if desired, and which is provided with a valve control stem 192 rigidly attached thereto, said stem having a plunger 194 guidingly and slidingly received in the tubular conduit 184, a valve closing spring 196 being engaged between the lower end of the plunger 194 and a suitable spring seat whereby the valve is urged by the spring to its closed position.

The upper end of the valve stem 192 is pivotally connected, as at 198, to an operating lever 200, suitably journaled upon a support, the outer end of this operating lever being pivoted, as at 202, to the end of an operating handle or lever 204. The arrangement is such that when the lever 204 is rotated in a counter-clockwise direction, as viewed in Figure 5, the lever 200 is oscillated in a clockwise direction to thereby force the valve 188 from its seat and thereby vent the interior of the compartment 16 to the interior of the vapor compartment 18. It will be noted that the extremity of the lever 204 is provided with a cam or eccentric member 206 which is adapted to abut against a surface carried by a bracket 208, whereby the valve may be locked in its open position by throwing the lever 204 in a counter-clockwise direction.

Figure 6:
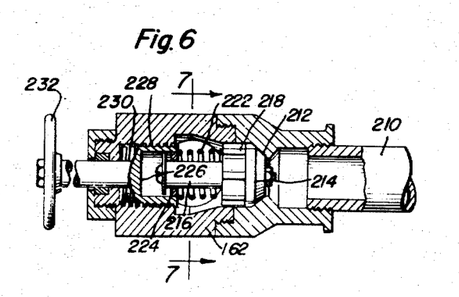
Figure 6 is a detail view taken in a vertical longitudinal section substantially upon the plane of the section line 6—6 of Figure 2 and illustrating the construction of the combined expansion and vent valve incorporated in the device.
Figure 7:
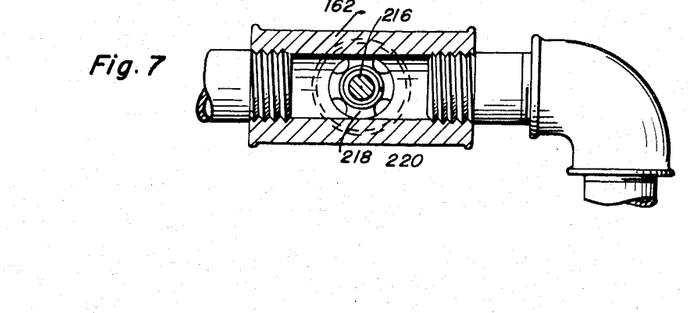
Figure 7 is a sectional detail view taken substantially upon the plane of the section line 7—7 of Figure 6.
Figure 8:
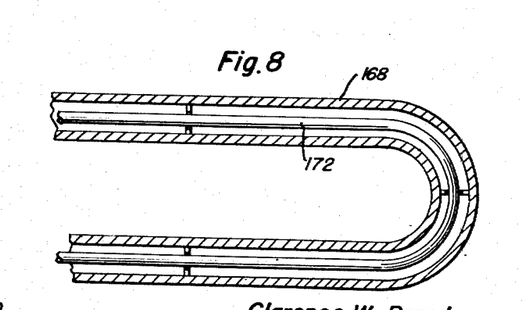
Figure 8 is an enlarged horizontal sectional view through a portion of the recirculating and refrigerating system of the invention.

Referring again to Figure 2 particularly, it will be seen that the upper end of the discharge conduit 163 is connected as by a laterally extending pipe 210 to the above-mentioned valve fitting 162, whose construction is shown best in Figures 6 and 7.

The valve fitting 162 is provided with a tapered valve seat 212 upon which is removably seated a valve member 214 having a valve stem 216. This valve is guided for sliding movement in the valve chamber by means of longitudinally extending guide ribs 218, see Figure 7, which define a plurality of parallel liquid flow channels 220 therebetween, by means of which fluid may be discharged from the conduit 210 past the valve and guide ribs 218 into the valve fitting 162 and from thence by means of the pressure reduction valves 166 into the refrigerating conduit system 168. The valve 214 is resiliently urged against the seat by means of a coil spring 222 which surrounds the valve stem 216 and abuts against the guide ribs 218 at one extremity and a retaining collar 224 suitably received in a recess 226 in a sleeve 228 which is screw-threadedly engaged in a bore 230 in the outer end of the valve casing 162. This sleeve is provided with an operating handle 232 by means of which the sleeve 228 may be moved inwardly and outwardly of the fitting 162.

The operation of this embodiment of the circulating and refrigerating system will now be described. With particular reference to the diagrammatic views of Figures 9–12, the operation is as follows: When the compartment 16 is filled initially with volatile liquid, a certain quantity of liquid is permitted to overflow the filling port, to thereby provide an accumulation of liquid in the sump 20, such as to the level indicated by the dotted line 234. This liquid serves to prime and submerge the inlet members 90 of the return line 172, and insures that there will be sufficient liquid present in the combined vapor and storage compartments of the tank 10 to at all times fill the conduit systems during operation while maintaining the compartment 16 entirely filled with liquid. It is desired to here emphasize that throughout the entire operation of this apparatus and method the pressure within the storage compartment 16 will preferably be above atmospheric pressure.

Figure 9:
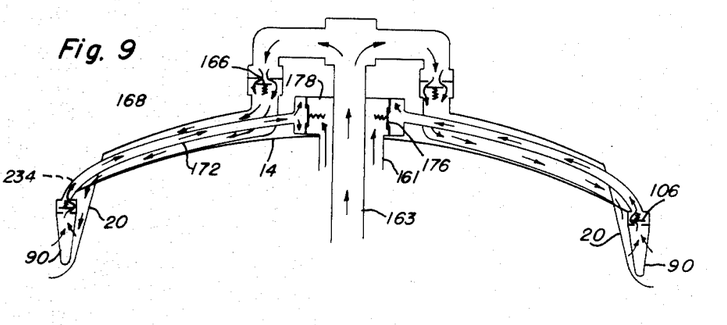
Figures 9-12 are diagrammatic views illustrating the cycle of operation of the recirculating and refrigerating system.

The diagrammatic view of Figure 9 discloses the conditions prevailing in the apparatus when the pressure within the storage chamber 16 has risen relative to the pressure of the vapor chamber 18, because of the inflow of heat into the tank. This rise in temperature, effecting a rise in pressure in the storage compartment 16, has, as shown in Figure 9, started a flow of liquid from the cooler portions of the tank upwardly through the discharge conduit 163 in the direction indicated by the arrows, has unseated the expansion valves 166 against the opposition of their closing springs, and has started a flow of the pressurized discharge liquid through the refrigerating and pressure reducing discharge conduits 168 as shown by the arrows therein, this flow into the sealed vapor compartment 18 tending to raise the pressure therein. This rise in pressure in the vapor compartment, applied to the level 234 of the liquid already contained therein, increases the pressure to which such liquid is subjected and causes a flow into the inlet member 90, as indicated by the arrows, and some of this liquid will pass the spring-opened check valve 106 to enter the return conduit 172 and fill the same as indicated by the arrows therein. However, the check valves 176 adjacent the discharge end of the return conduit, and which are normally closed by their closure springs 178, are further positively closed, since they are subjected to the increased pressure within the storage chamber 16 by means of the free communication of the latter through the return conduit or pipe 161.

It will thus be seen that during the initial stage of the operation, the rise in pressure in the storage tank has produced an outward flow of the cooler portion of the liquid therein, and has, at the same time, positively closed the check return valves 176 at the upper or discharge ends of the return conduits, and has further forced liquid into the return conduits or increased the pressure therein. After passing the pressure reduction valves 166, the fluid in the conduits 168 is chilled thereby and absorbs heat from the return conduit 172, thereby refrigerating the latter as well as the walls of the conduit 168 and all parts with which the latter is in heat exchange relation. This chilling of the conduit 172 and its contents lowers the pressure therein, thereby assisting the augmented pressure imposed on the liquid level 234 in filling conduit 172. This action tends to prolong the flow and circulatory movement of fluids. This action has further resulted in lowering the pressure within the storage compartment 16 by reason of the withdrawal of a portion of the contents thereof, and further, because of the refrigerating action of the expanding liquid in the discharge conduits 168, has lowered the temperature of the storage tank and, hence, further reduced the pressure to which the confined liquid therein is subjected.

Figure 10:
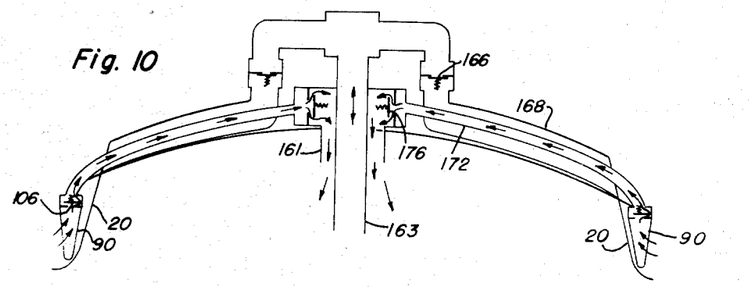

When now a new ratio of pressures has been established between the storage and vapor compartments, by reason of the reduction of pressure in the storage tank from its maximum increased pressure, and by the above mentioned cooling effects, the condition depicted in Figure 10 will prevail. Since the pressures between the tanks 16 and 18 have reached equilibrium, there will be a temporary cessation of flow through the discharge conduit 163, as shown by the double-headed arrow therein, and consequently the reducing valves 166 will be closed against their seats by their springs and there will be no flow through the refrigerating conduit 168, as indicated by the absence of flow arrows therein. However, the reduction of the pressure within the storage compartment 16 by reason of the cooling and partial withdrawal of the liquid therein now leaves the vapor compartment and the conduit 172 at a relatively higher pressure which would be augmented by the inflow of heat with the vapor compartment, which pressure forces open the spring-closed valves 106 and induces a flow of liquid from the sump 20, as indicated by the arrows, through the return conduit 172, and this pressure difference forces open the check valves 176 and forces liquid from the sump 20 through the return conduit 161 and back into the interior of the storage compartment 16, as indicated by the arrows in Figure 10, this action continuing until the pressures of the chambers 16 and 18 are again in equilibrium.

It should be here noted that during the latter part of this return flow, the pressure in chamber 18 may drop below that in the conduit 172 whereupon the valves 106 will close. As the elevated pressure and heat in conduit 172 acts against the closed valves 106 and the liquid trapped thereby, a flow is induced past valve 176 into chamber 16. This causes a pressure rise which, in turn, may (depending upon the pressures involved and the closing bias of valve 166) cause a flow from 16 through the discharge conduit 163 and passages 168 into vapor compartment 18.

The above described operation represents the refrigerating circulating primary cycle of the device, and as hereinbefore mentioned, this cycle of operation is effected at relatively long intervals of time by the creation of a sufficient pressure differential between the relatively large volumes contained in the storage and vapor chambers.

However, a portion of this apparatus is capable of much more frequent and sensitive operation, and its functioning constitutes what may be termed the sensitive or secondary refrigerating and circulating system. When the above described pressure equilibrium has been reached after the operation described in connection with Figure 10 has been effected, the condition shown in Figure 11 will exist wherein there is no flow of fluid between the chambers. However, since it is assumed that the tank is constantly subjected to an inflow of heat from an external source, such as the sun's rays or the like, it will be appreciated that the vapor compartment, and hence the conduit system associated therewith, and which overlies the storage compartment, will be heated faster than the bulk of the liquid in the storage compartment. Consequently, the relatively small quantity of fluid which is trapped and retained in the return conduit 172 between the inlet and discharge check valves 106 and 176 thereof will be subjected to a relatively rapid rise in temperature and a resultant relatively rapid increase in pressure over the change of temperature and pressure of the body of liquid in the storage chamber. This rise in pressure within the return conduit thus closes the check valve 106 and forces open the check valve 176, thereby inducing a flow of fluid through the return conduit 161 into the tank storage compartment 16 as indicated by the arrows in Figure 11.

Figure 11:
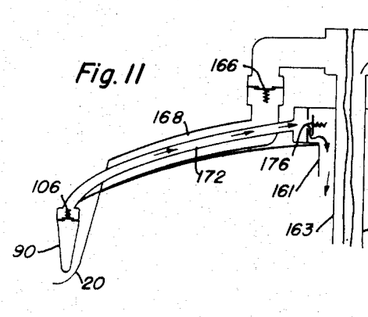

It will be noted that this return flow just mentioned may be assisted by and, in fact, may even be occasioned by the increased pressure generated in the vapor compartment 18 by the relatively rapid heating thereof.

Figure 12:
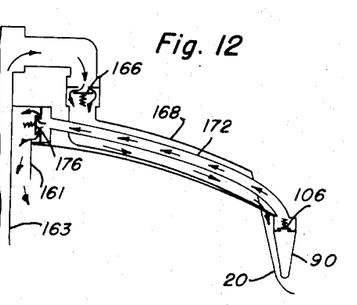

When the initial stage of the operation indicated in Figure 11 has been completed, it will be seen that the liquid return to the storage chamber 16 will produce a pressure rise therein, whereby the pressure within the chamber 16 will then be somewhat above that prevailing in the chamber 18. Accordingly, as indicated in Figure 12, the increased pressure in the chamber 16 will induce a flow as shown by the arrows, through the discharge conduit 163, and thence through the pressure reduction valve 166, into and through the refrigerating conduit 168.

It will be readily apparent that there is produced a step-by-step movement of liquid from the cooler portions of the storage chamber, through the discharge conduit and refrigerating coils connected thereto, to the relatively more highly heated vapor chamber; thus producing a cooling effect therein as well as on the upper portion of the storage chamber, this being followed by a return of the cooled or chilled discharged fluid through the return conduits into the hotter portions of the storage chamber, thus effecting a mixing action of the hotter and cooler portions of the liquid within the storage chamber as well as utilizing the thermodynamic forces of the external source of heat to cause this operation and minimize the temperature and pressure extremes heretofore encountered in storing volatile liquids and fluids in sealed containers.

It is to be particularly noted that it is an inherent function of this heat exchange arrangement of the discharge and return conduits to effect a prolongation of the discharge flow through the discharge conduit 163, since when the systems are full of fluid and in the condition indicated in Figure 9, the outward flow through the discharge conduit 163 into the lower pressure of the vapor chamber will be accompanied by a gradual reduction of the pressure within the chamber 16, until just prior to the condition indicated in Figure 10, when there will be a simultaneous outflow through the conduit 163 accompanied by a smaller inflow through the conduit 161, this inflow being occasioned by the reduction of pressure against the check valve 176, while the check valve 106 remains closed.

Obviously, in the sensitizing or secondary circulatory system, the conduits 172 with their inlet and outlet check valves 106 and 176 actually function as fluid pumps for repeatedly and intermittently delivering liquid from the sumps 20 into the tank 16, such inlet of liquid occasioning a corresponding outflow from the discharge conduit 163. It will be evident that the motivating and controlling factor for this cyclic operation is a constantly varying relative pressures existing in the compartment 16, the compartment 18, and the chambers which are defined by the return conduits 172.

It will be seen that during operation of the system, cooling action occurs in at least five distinct phases or actions, as follows:

(1) By means of a direct flow of heat between the heat conducting walls between the two fluids at different temperatures, as by the flow of heat between chambers 16 and 18 through the partition 14 and/or the walls of the tank 10, a similar flow between the refrigerating coils and the return conduits, as well as between either chamber and/or the conduit system and the surrounding water medium.

(2) By means of the pressure reduction in the confined body when fluid is withdrawn or expelled therefrom, this cooling action being effected during and supplementing that of the preceding paragraph.

(3) By means of the expansion of the withdrawn fluid into a lower pressure zone whereby it is chilled and absorbs heat from its surroundings, as during the fluid flow through the pipe system 168 and 172.

(4) By means of the expulsion of vapor accompanied possibly by some fluid not entirely vaporized from the end of the concentric tube 168 into the vapor chamber 18, this vaporization producing a further heat absorption and cooling action.

(5) By means of the pressure reduction in the vapor chamber 18 when there is a withdrawal of fluid therefrom by the tubing 172.

I desire it to be distinctly understood that although the secondary system has been described and may very efficiently consist of concentric discharge and return conduits, yet various other relative arrangements of these conduits disposed at different positions in the storage and vapor chambers could be employed as necessity dictates. Moreover, if desired, these conduits could be provided and arranged in substantially non-heat exchange relation with respect to each other, the effect of this being that the discharge and return flows of the cycle of operation would be of greater duration and would occur at less frequent intervals than when the pipes are disposed in the above-mentioned intimate heat exchange relation with respect to each other.

It is to be further understood that although the illustrations have depicted the partition 14 as either concaved or convexed with respect to the walls of the tank 10, the invention may be realized by partitions of various other configurations. For example, a partition having planar, sloping sides may be employed and the discharged liquid may be caused to flow down the sloping sides to a collection trough or troughs, both to provide the cooling action desired as well as to collect and accumulate the discharged liquids in sumps. The rate of flow over the sloping surfaces, whether planar or curved, may be utilized more efficiently by providing baffles or channels thereon to cause the descending liquid to follow more or less tortuous paths and hence prolong its heat exchange relation with the surface of the partition.

It will, of course, be evident that the various valves will be calibrated or adjusted to allow for the various hydrostatic heads to which they may be exposed.

It should be especially noted that the method and apparatus set forth hereinbefore all possess the advantage that they are capable of use in storage systems wherein the vapors generated by and accompanying the storage of volatile liquids are in themselves possessed of sufficient value to warrant provision for their retention and salvaging. The practicing of this invention in such environments thus does not necessitate the creation of additional storage compartments for either liquid or vapor, but merely advantageously utilizes such existing features of construction.

From the foregoing, it is thought that the mode of employing the method and apparatus hereinbefore set forth, together with their numerous advantages, will be readily apparent, and further explanation is believed to be unnecessary. However, since numerous modifications and changes falling within the purview of the invention will be readily understood by those skilled in the art after a consideration of the foregoing specification and accompanying drawings, it is not desired to limit the invention to the exact method and constructions shown or described in the foregoing specification and annexed drawings, except as required by the appended claims.

Having described the invention, what is claimed as new is:

1. The method of maintaining a confined body of fluid which is subjected to external heating effects below a predetermined temperature and pressure, which comprises, educting a portion of the fluid when said confined body exceeds said predetermined pressure, cooling said educted portion, placing said cooled portion in heat exchange relation to said confined body, discharging said cooled portion into a confined region, inducing a unidirectional, intermittent flow of a part of said discharged portion into a restricted zone and returning said part of said discharged portion from said restricted zone in a unidirectional, intermittent flow to said confined body whenever the pressure in the restricted zone exceeds that of the confined body, the discharge flow from the confined body and the return flow from the restricted zone to the confined body being conducted in paths in heat exchange relation to each other.

2. The method of claim 1 wherein said paths are in concentric relation to each other.

3. An apparatus for storing fluids comprising sealed storage and vapor compartments, discharge means responsive to a predetermined pressure for discharging fluid from said storage to said vapor compartment, means for cooling the discharged fluid, conduits for placing the cooled fluid in heat exchange relation with said storage compartment and return means for returning fluid from said vapor to said storage compartment when the pressure in the former exceeds that of the latter, said discharge and return means being in heat exchange relation.

4. The combination of claim 3 wherein said discharge and return means are concentrically disposed.

5. A method for reducing the pressure thermodynamically generated by external heating sources in confined bodies of volatile liquids having liquid and vapor storage chambers and discharge and return conduits each communicating with both of said chambers, comprising cooling the contents of the storage chamber by withdrawing a portion of the fluid confined therein in response to pressures above a predetermined limit, reducing the pressure and thereby the temperature of the withdrawn portion while the latter traverses the discharge conduit, placing the discharge conduit in thermally conductive relation to the contents of said storage chamber for additionally cooling the latter, placing the return conduit in thermally conductive relation to said discharge conduit for causing heat flow therebetween and causing a flow of said withdrawn portion through said return conduit into said storage chamber when the pressure in the return conduit exceeds that in the storage chamber by a predetermined value.

6. A method for reducing the pressures thermodynamically generated by external heating sources in confined bodies of volatile liquids having liquid and vapor storage chambers and discharge and return conduits each communicating with both of said chambers, comprising cooling the contents of the storage chamber by withdrawing a portion of the fluid confined therein in response to pressures above a predetermined limit, reducing the pressure and thereby the temperature of the withdrawn portion while the latter traverses the discharge conduit, placing the discharge conduit in thermally conductive relation to the contents of said storage chamber for additionally cooling the latter, prolonging the period of pressure reduction and hence of heat exchange between said conduits by placing the return conduit in thermally conductive relation to said discharge conduit for causing heat flow therebetween and causing a flow of said withdrawn portion through said return conduit into said storage chamber when the pressure in the return conduit exceeds that in the storage chamber by a predetermined value.

7. The method of claim 5 wherein the last mentioned step is effected at chronologically spaced intervals.

8. That method for reducing the pressures thermodynamically generated by external heating in confined bodies of volatile liquids having storage and vapor chambers connected by discharge and return conduits, which includes sequentially transferring liquid between the storage and vapor chambers in response to predetermined pressure differences therebetween while maintaining the storage chamber continuously filled with liquid, lowering the pressure of the withdrawn liquid during transit to decrease its temperature and cooling the confined body by direct heat exchange with the fluid in the vapor compartment and with an external coolant, by lowering the pressure within the confined body and by the absorption of heat therefrom by the pressure reduction in the withdrawn liquid, the duration of the flow through the discharge conduit being prolonged by the reduction in pressure in the return conduit occasioned by the absorption of heat from the fluid in the return conduit by the fluid in the discharge conduit.

9. That method for reducing the pressures thermodynamically generated by external heating in confined bodies of volatile liquids having storage and vapor chambers connected by discharge and return conduits, which includes sequentially transferring liquid between the storage and vapor chambers in response to predetermined pressure differences therebetween while maintaining the storage chamber continuously filled with liquid, lowering the pressure of the withdrawn liquid during transit to decrease its temperature and cooling the confined body by direct heat exchange with the fluid in the vapor compartment and with an external coolant, by lowering the pressure within the confined body and by the absorption of heat therefrom by the pressure reduction in the withdrawn liquid, the further step of conducting the withdrawn fluid in concentric paths in heat exchange relation through the discharge and return conduits.

10. An apparatus for storing volatile liquids comprising storage and vapor compartments separated from each other by a partition and sealed from the atmosphere, discharge means responsive to a predetermined pressure ratio in said compartments for discharging fluid from the storage to the vapor compartment and return means responsive to another predetermined pressure ratio in said compartments for returning fluid from the vapor to the storage compartment, one of said means including a conduit disposed in direct contact and heat exchange relation to said partition and having portions disposed in both said compartments and in heat exchange relation therewith.

11. An apparatus for storing volatile liquids comprising storage and vapor compartments separated from each other by a partition and sealed from the atmosphere, discharge means responsive to a predetermined pressure ratio in said compartments for discharging fluid from the storage to the vapor compartment and return means responsive to another predetermined pressure ratio in said compartments for returning fluid from the vapor to the storage compartment, each of said means including a conduit disposed in direct contact and heat exchange relation to said partition and having portions disposed in both said compartments and in heat exchange relation therewith.

12. The combination of claim 10 wherein the other of said means includes a second conduit in heat exchange relation to said first mentioned conduit.

13. The combination of claim 12, wherein said conduits are concentrically disposed.

14. An apparatus for storing volatile liquids comprising storage and vapor compartments separated from each other by a partition and sealed from the atmosphere, discharge means responsive to a predetermined pressure ratio in said compartments for discharging fluid from the storage to the vapor compartment and return means responsive to another predetermined pressure ratio in said compartments for returning fluid from the vapor to the storage compartment, said discharge and return means each including a conduit, said conduits being disposed in heat exchange relation, one of said conduits having therein thermally actuated means for pumping fluid unidirectionally with an intermittent flow.

15. The combination of claim 14, wherein said last means comprises a pair of said non-return valves both opening in the direction of flow.

16. The combination of claim 10, including means to directly vent the compartments to each other.

17. An apparatus for storing volatile liquids comprising storage and vapor compartments sealed from the atmosphere, discharge means responsive to a predetermined pressure ratio in said compartments for discharging fluid from the storage to the vapor compartment and return means responsive to another predetermined pressure ratio in said compartments for returning fluid from the vapor to the storage compartment, one of said means including a conduit disposed in direct contact and heat exchange relation to both of said compartments and having portions disposed in each of said compartments.

18. The combination of claim 17 wherein the other of said means includes a second conduit in heat exchange relation to said first-mentioned conduit.

19. The combination of claim 17 wherein the other of said means includes a second conduit in heat exchange relation to said first-mentioned conduit, said conduits being eccentrically disposed.

20. An apparatus for storing volatile liquids comprising storage and vapor compartments sealed from the atmosphere, discharge means responsive to a predetermined pressure ratio in said compartments for discharging fluid from the storage to the vapor compartment and return means responsive to another predetermined pressure ratio in said compartments for returning fluid from the vapor to the storage compartment, said discharge and return means each including a conduit, said conduits being disposed in heat exchange relation, one of said conduits having thermally actuated means for pumping fluid unidirectionally with an intermittent flow.

21. The combination of claim 17 including means associated with one of said conduits to directly vent the compartments to each other.

References Cited in the file of this patent

UNITED STATES PATENTS

| Number | Name | Date |
|---|---|---|
| 1,371,427 | Kerr | Mar. 15, 1921 |
| 2,059,942 | Gibson | Nov. 3, 1936 |
| 2,344,765 | Dana et al. | Mar. 21, 1944 |
| 2,408,505 | Brandon et al. | Oct. 1, 1946 |